(12) United States Patent
Masahashi et al.

(10) Patent No.: US 12,484,874 B2
(45) Date of Patent: Dec. 2, 2025

(54) X-RAY DIAGNOSTIC APPARATUS

(71) Applicant: CANON MEDICAL SYSTEMS CORPORATION, Otawara (JP)

(72) Inventors: Junji Masahashi, Otawara (JP); Katsunori Kojima, Hadano (JP); Norio Soutsuka, Nasushiobara (JP); Tsutomu Ichikawa, Yokohama (JP); Tatsuaki Kodaka, Nasushiobara (JP); Shoji Yashiro, Nasushiobara (JP); Tamotsu Ino, Yaita (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 325 days.

(21) Appl. No.: 18/178,633

(22) Filed: Mar. 6, 2023

(65) Prior Publication Data

US 2023/0293133 A1 Sep. 21, 2023

(30) Foreign Application Priority Data

Mar. 15, 2022 (JP) .................................. 2022-040701

(51) Int. Cl.
  *A61B 6/00* (2024.01)
  *A61B 6/08* (2006.01)
  *A61B 6/58* (2024.01)
(52) U.S. Cl.
  CPC ............... *A61B 6/545* (2013.01); *A61B 6/08* (2013.01); *A61B 6/587* (2013.01)
(58) Field of Classification Search
  CPC ............ A61B 6/08; A61B 6/545; A61B 6/587
  See application file for complete search history.

(56) References Cited

U.S. PATENT DOCUMENTS

| | | | | | |
|---|---|---|---|---|---|
| 3,846,632 | A | * | 11/1974 | Rabodzei ............. | G03B 42/028 378/43 |
| 5,359,640 | A | * | 10/1994 | Fink ..................... | G01N 23/207 378/81 |
| 5,768,336 | A | * | 6/1998 | Khutoryansky ..... | A61B 6/0487 378/146 |
| 6,196,715 | B1 | * | 3/2001 | Nambu .................. | A61B 6/504 378/197 |
| 7,841,772 | B2 | * | 11/2010 | Nishii .................. | A61B 6/5235 378/63 |

(Continued)

FOREIGN PATENT DOCUMENTS

JP 2001-37747 A 2/2001

*Primary Examiner* — Blake C Riddick
(74) *Attorney, Agent, or Firm* — Oblon, McClelland, Maier & Neustadt, L.L.P.

(57) ABSTRACT

The X-ray diagnostic apparatus according to any of embodiments includes an X-ray tube, an X-ray detector and processing circuitry. The X-ray tube is configured to irradiate an imaging region of a subject with X-rays. The X-ray detector is configured to detect the X-rays. The processing circuitry is configured to acquire an incident angle of the X-rays corresponding to a clinical purpose of the imaging region, and acquire image data from an image sensor that images the imaging region. The processing circuitry is configured to rotate the X-ray tube in accordance with the acquired incident angle of the X-rays, and slide a position of a central path of the X-rays with respect to the imaging region based on the image data.

9 Claims, 9 Drawing Sheets

(56) References Cited

U.S. PATENT DOCUMENTS

| | | | |
|---|---|---|---|
| 2006/0109957 A1* | 5/2006 | Lutjens | A61B 6/587 378/205 |
| 2008/0292053 A1* | 11/2008 | Marash | A61B 6/04 378/65 |
| 2011/0254922 A1* | 10/2011 | Schaerer | A61B 90/39 348/46 |
| 2014/0267697 A1* | 9/2014 | Wong | A61B 6/4216 348/135 |
| 2015/0078516 A1* | 3/2015 | Ohashi | A61B 6/4042 378/42 |
| 2015/0190108 A1* | 7/2015 | Li | A61B 6/4085 378/41 |
| 2015/0374325 A1* | 12/2015 | Shimizu | A61B 6/4441 378/98 |
| 2016/0015345 A1* | 1/2016 | Noda | A61B 6/504 378/197 |
| 2016/0023019 A1* | 1/2016 | Filiberti | A61N 5/1075 600/1 |
| 2016/0074000 A1* | 3/2016 | Uehara | A61B 6/547 378/69 |
| 2016/0166230 A1* | 6/2016 | Kim | A61B 6/465 378/205 |
| 2016/0192894 A1* | 7/2016 | Ohishi | G16H 30/20 715/771 |
| 2016/0195849 A1* | 7/2016 | Takagi | G06F 3/017 348/40 |
| 2016/0220216 A1* | 8/2016 | Karahashi | A61B 6/5288 |
| 2016/0296195 A1* | 10/2016 | Abe | A61B 6/542 |
| 2017/0181718 A1* | 6/2017 | Akiyama | A61B 6/487 |
| 2017/0360389 A1* | 12/2017 | Ochiai | A61B 6/502 |
| 2018/0014809 A1* | 1/2018 | Lin | A61B 6/582 |
| 2018/0035968 A1* | 2/2018 | Yamahana | A61B 6/486 |
| 2019/0200945 A1* | 7/2019 | Tsuyuki | A61B 6/0487 |
| 2019/0318823 A1* | 10/2019 | Takaya | A61B 6/504 |
| 2021/0353240 A1* | 11/2021 | Sato | A61B 6/107 |
| 2023/0329654 A1* | 10/2023 | Kim | A61B 5/0035 |

\* cited by examiner

EXAMINATION ORDER

| DOCTOR'S NAME (ID) | PATIENT'S NAME (ID) | TYPES OF MEDICAL IMAGING DIAGNOSTIC APPARATUS | CLINICAL PURPOSE OF IMAGING REGION | ... |
|---|---|---|---|---|
| TOKKYO TARO (D001) | JITSUAN JIRO (P0021) | X-RAY DIAGNOSTIC APPARATUS | FRACTURE DIAGNOSIS OF KNEE JOINT | ... |
| ... | ... | ... | ... | ... |

FIG. 3A

ASSOCIATION TABLE

| CLINICAL PURPOSE OF IMAGING REGION | IMAGING REGION | POSTURE OF EXAMINEE | INCIDENT ANGLE OF X-RAYS | ANGLE OF HEAD-FOOT ROTATION: 10° ON FOOT SIDE |
|---|---|---|---|---|
| FRACTURE DIAGNOSIS OF KNEE JOINT | KNEE JOINT | EXTENDED STATE | ... | ... |
| ... | ... | ... | ... | ... |

X-RAY DIAGNOSTIC APPARATUS

CROSS-REFERENCE TO RELATED APPLICATION

This application is based upon and claims the benefit of priority from Japanese Patent Application No. 2022-040701, filed on Mar. 15, 2022, the entire contents of which are incorporated herein by reference.

FIELD

Disclosed embodiments relate to an X-ray diagnostic apparatus.

BACKGROUND

There is an X-ray diagnostic apparatus that acquires image signals of a subject by irradiating a subject with X-rays and detecting transmitted X-rays with an X-ray detector. The X-ray diagnostic apparatus displays an X-ray image on a display by processing image signals in an image processer. Furthermore, in a general X-ray diagnostic apparatus, a system is known in which an X-ray detector is combined with an examination stand for an upright imaging and an examination table for a lie-down imaging. The system suspends the X-ray tube using a movable supporter on the ceiling, and performs imaging by moving and rotating the X-ray tube to an appropriate imaging region according to a position of the examination stand for the upright imaging or the lie-down imaging by means of an input interface.

In joint imaging for orthopedic surgery and the like, it is necessary to image the human body with different incident angles of X-ray by several degrees to several tens of degrees for different clinical purpose of each imaging region. Therefore, the examinee who is the subject is required to take an ideal posture, and then the operator positions a tube holder holding the X-ray tube such that the incident angle corresponding to the posture is ideal.

BRIEF DESCRIPTION OF THE DRAWINGS

Each of FIGS. 5A to 5C is an explanatory diagram showing a state of the X-ray tube in the X-ray diagnostic apparatus according to the embodiment.

Each of FIGS. 7A to 7C is an explanatory diagram showing a state of the X-ray tube in the first modification of the X-ray diagnostic apparatus according to the embodiment.

Each of FIGS. 9A to 9C is an explanatory diagram showing a state of the X-ray tube in the second modification of the X-ray diagnostic apparatus according to the embodiment.

DETAILED DESCRIPTION

An X-ray diagnostic apparatus according to any of embodiments will be described with reference to the accompanying drawings.

The X-ray diagnostic apparatus according to any of embodiments includes an X-ray tube, an X-ray detector and processing circuitry. The X-ray tube is configured to irradiate an imaging region of a subject with X-rays. The X-ray detector is configured to detect the X-rays. The processing circuitry is configured to acquire an incident angle of the X-rays corresponding to a clinical purpose of the imaging region, and acquire image data from an image sensor that images the imaging region. The processing circuitry is configured to rotate the X-ray tube in accordance with the acquired incident angle of the X-rays, and slide a position of a central path of the X-rays with respect to the imaging region based on the image data.

Figure 1:
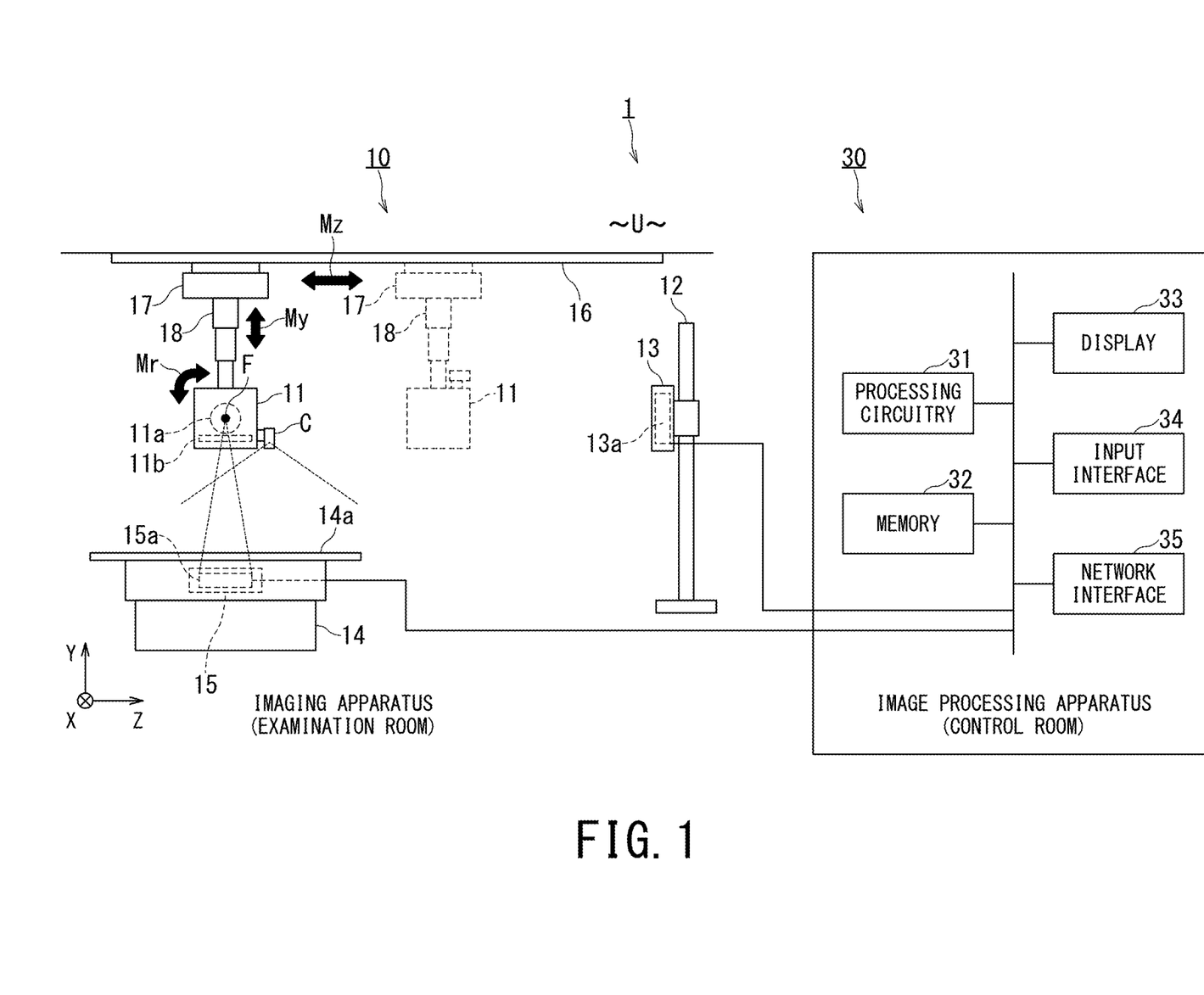
FIG. 1 is a schematic diagram showing a configuration of an X-ray diagnostic apparatus according to an embodiment.
Figure 2:
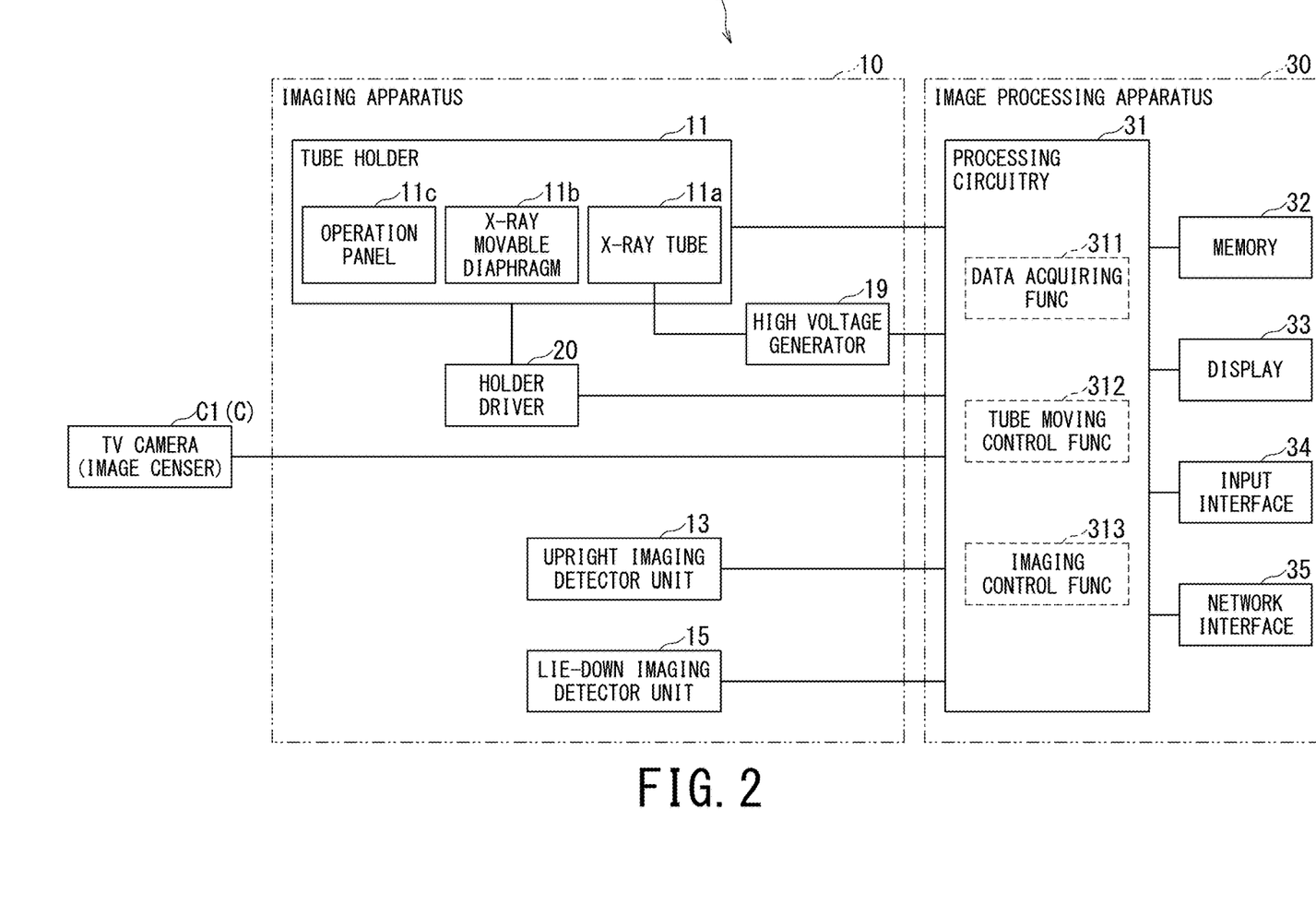
FIG. 2 is an overall configuration diagram of the X-ray diagnostic apparatus according to the embodiment.

FIG. 1 is a schematic diagram showing a configuration of an X-ray diagnostic apparatus according to an embodiment. FIG. 2 is an overall configuration diagram of the X-ray diagnostic apparatus according to the embodiment.

FIGS. 1 and 2 show an X-ray diagnostic apparatus 1 according to an embodiment. The X-ray diagnostic apparatus 1 includes an imaging apparatus 10 and an image processing apparatus (for example, console) 30. The imaging apparatus 10 is usually provided in an examination room, while the image processing apparatus 30 is provided in a control room adjacent to the examination room. FIGS. 1 and 2 also show an image sensor C.

The imaging apparatus 10 includes a tube holder 11, an examination stand 12 for an upright imaging, a upright imaging detector unit 13, a bed 14 as an examination table for a lie-down imaging, a lie-down imaging detector unit 15, a ceiling rail 16, a carriage 17, a pole brace 18, a high voltage generator 19, and a holder driver 20.

The tube holder 11 holds an X-ray tube 11a, an X-ray movable diaphragm 11b, and an operation panel 11c. The X-ray tube 11a is supplied with power from the high voltage generator 19 and irradiate an imaging region of a subject (for example, a patient) placed in front of the examination stand 12 for the upright imaging or on the bed 14 with X-rays. The X-ray movable diaphragm 11b is composed of, for example, diaphragm blades. Each of the diaphragm blades is a flat blade made of lead or the like to shield X-rays. A region surrounded by the diaphragm blades forms an aperture through which X-rays pass.

The operation panel 11c is attached to the outer wall of the tube holder 11. The operation panel 11c is a display that displays image data acquired by the image sensor C capturing an image of the examinee. The operation panel 11c can employ a graphical user interface (GUI) that makes extensive use of graphics to display information on the display for the operator and allows basic operations to be performed through an input interface.

The tube holder 11 passes through the X-ray focus F of the X-ray tube 11a, and is engaged with the pole brace 18 such that the tube holder 11 is rotatable around an axis (for example, the X-axis) perpendicular to extension and contraction direction of the pole brace 18 along a direction Mr. Under the control of processing circuitry 31 of the image processing apparatus 30, the holder driver 20 enables the tube holder 11 to be rotatable around the X-axis (or Y-axis or Z-axis) that passes through the X-ray focus F, within a range of −180° to +180° along the rotational direction Mr.

The examination stand 12 for the upright imaging is arranged vertically at a position facing the tube holder 11.

The upright imaging detector unit 13 is supported by the examination stand 12 for the upright imaging and is arranged in a position that enables to detect X-rays from the X-ray tube 11a. The upright imaging detector unit 13 is changed in height along with the examination stand 12 according to the height change of the tube holder 11 under the control of the processing circuitry 31 of the image processing apparatus 30. Here, the height direction of the examination stand 12 is defined as the Y-axis direction. The right and left direction of the examinee standing close to the examination stand 12 is defined as the X-axis direction. A direction orthogonal to the X-axis direction and the Y-axis direction is defined as the Z-axis direction.

The upright imaging detector unit 13 includes a upright imaging FPD 13a, a housing (bucky) (not shown) capable of storing the upright imaging FPD 13a, an A/D (analog to digital) conversion circuit (not shown) for digitally converting the output signals of the upright imaging FPD 13a, etc. The upright imaging FPD 13a includes a upright imaging FPD body that has two-dimensionally arranged detection elements and detects X-rays, and a grid (not shown) on the front surface of the upright imaging FPD body. In the grid, grid plates made of lead that absorbs X-rays greatly, and aluminum, wood, and the like where X-rays can easily transmit, are alternately arranged. Such an arrangement is made for improving the contrast of the X-ray image by absorbing the scattered X-rays incident on the upright imaging FPD body. The upright imaging FPD 13a detects X-rays transmitted through a standing patient in a simple imaging, and outputs the detected X-rays to the image processing apparatus 30 as image signals. The upright imaging detector unit 13 can slide the upright imaging FPD 13a along the X-axis, the Y-axis, and the Z-axis in the housing under the control of the processing circuitry 31 of the image processing apparatus 30.

The bed 14 is arranged sideways such that a patient in lying or sitting posture can be placed thereon. The bed 14 has an examination table 14a for holding a patient on its top. The bed 14 can slide the examination table 14a along the X-axis, Y-axis and Z-axis under the control of the processing circuitry 31 of the image processing apparatus 30.

The lie-down imaging detector unit 15 is supported by the bed 14. The lie-down imaging detector unit 15 includes a lie-down imaging FPD 15a, a housing (bucky) (not shown) capable of storing the lie-down imaging FPD 15a, and an A/D conversion circuit for digitally converting the output signals of the lie-down imaging FPD 15a. The lie-down imaging FPD 15a has the same structure and function as the aforementioned upright imaging FPD 13a. The lie-down imaging FPD 15a detects X-rays transmitted through a lying patient by X-ray imaging, and outputs the detected X-rays to the image processing apparatus 30 as image signals.

The ceiling rail 16 is laid on a ceiling U.

The carriage 17 supports the tube holder 11 via the pole brace 18. The carriage 17 is engaged with the ceiling rail 16 so as to be movable in the direction Mz parallel to the Z-axis along the ceiling rail 16. The carriage 17 allows the tube holder 11 to move between the examination stand 12 and the bed 14 under the control of the processing circuitry 31 of the image processing apparatus 30 or by manual operation. That is, the carriage 17 can change the distance (SID: source image receptor distance) between the X-ray tube 11a (X-ray focus F) and the upright imaging FPD 13a. In addition to the direction Mz along the ceiling rail 16, the carriage 17 may be installed so as to be movable in a direction parallel to the X-axis.

The pole brace 18 is supported by the carriage 17 and supports the tube holder 11 at its lower end. The pole brace 18 is engaged with the carriage 17 so as to be movable in the direction My parallel to the Y-axis. The pole brace 18 is extendable along the direction My under the control of the processing circuitry 31 of the image processing apparatus 30. That is, the pole brace 18 can change the distance (SID) between the X-ray tube 11a (X-ray focus F) and the lie-down imaging FPD 15a.

The high voltage generator 19 can supply high voltage power to the X-ray tube 11a of the tube holder 11 under the control of the processing circuitry 31 of the image processing apparatus 30.

The image processing apparatus 30 is configured based on a computer, and is an apparatus that controls the operation of the entire X-ray diagnostic apparatus 1 and performs image processing on X-ray images (X-ray image data) acquired by the imaging apparatus 10. The image processing apparatus 30 includes processing circuitry 31, a memory 32, a display 33, an input interface 34 and a network interface 35.

The processing circuitry 31 refers to, processors such as a dedicated or general-purpose CPU (Central Processing Unit), MPU (Micro Processor Unit), or the like, as well as processing circuitry such as application specific integrated circuits (ASICs), and programmable logic devices. Examples of programmable logic devices include circuits such as SPLDs (Simple Programmable Logic Devices), CPLDs (Complex Programmable Logic Devices), and FPGAs. The processing circuitry 31 controls the operation of the imaging apparatus 10 by reading and executing a program stored in the memory 32 or directly incorporated in the processing circuitry 31, thereby realizing a function of performing imaging according to instructions and generating an X-ray image.

The processing circuitry 31 may be configured by a single circuit or by combination of independent processing-circuit elements. In the latter case, a plurality of the memory 32 may be provided individually to store each program corresponding to the function of the processing-circuit elements or one memory 32 may be provided to store all the programs corresponding to the functions of the processing-circuit elements.

The memory 32 is composed of, for example, a hard disk, an optical disc, or a semiconductor memory element such as a RAM (Random Access Memory) and a flash memory. The memory 32 may be composed of portable media such as a USB (Universal Serial Bus) memory and a DVD (Digital Video Disk). The memory 32 stores various processing programs in the processing circuitry 31 (including not only application programs but also an OS (Operating System)), data necessary for executing the programs, and/or the X-ray image, for example. In addition, the OS may include GUI (Graphical User Interface) that makes extensive use of graphics when displaying information for an operator on the display 33 and allows basic operations to be performed through the input interface 34.

The display 33 is composed of a general display output device such as a liquid crystal display or an OLED (Organic Light Emitting Diode) display. The display 33 displays images and various information under the control of the processing circuitry 31.

The input interface 34 includes: an input device that can be operated by an operator; and an input circuit that inputs signals from the input device. The input device is configured of, for example, a trackball, a switch, a mouse, a keyboard, a touch pad that enables input operations by touching an operation screen, a touch screen in which a display screen and a touch pad are integrated, a non-contact input device using an optical sensor, and a voice input device. When the operator manipulates the input device, the input circuit generates a signal corresponding to the manipulation and outputs the generated signal to the processing circuitry 31.

The network interface 35 is composed of connectors that conform to parallel connection specifications and/or serial connection specifications. The network interface 35 has a function of performing communication control in accordance with respective standards and connecting with the network through a telephone network, and thereby connecting the X-ray diagnostic apparatus 1 to the network N.

The image sensor C is configured of an optical camera. The optical camera may be, for example, a TV camera C1. The TV camera C1 is a camera for taking moving images. The image sensor C is attached to a portion, e.g., the tube holder 11, that moves and rotates along with the movement and rotation of the X-ray tube 11*a*. The image sensor C digitally converts the acquired image data and outputs it to the image processing apparatus 30. Though the image sensor C being not included in the configuration of the X-ray diagnostic apparatus 1 has been described, it can be part of the configuration of the X-ray diagnostic apparatus 1.

Here, functions of the X-ray diagnostic apparatus 1 will be described.

A processing circuitry 31 of the image processing apparatus 30 executes a computer program, thereby the image processing apparatus 30 implements a data acquiring function 311, a tube moving control function 312, and an imaging control function 313, as illustrated in FIG. 2. Though the functions 311 to 313 are described as being implemented by executing a computer program, it is not limited to this case. All or part of the functions 311 to 313 may be implemented in the image processing apparatus 30 as hardware such as ASIC.

Figure 3A:
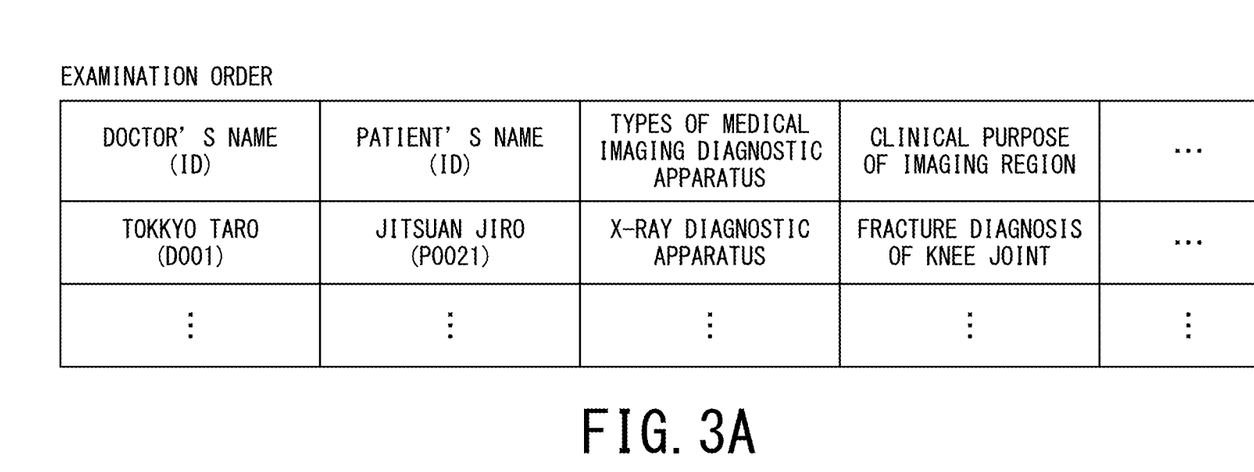
FIG. 3A is a table showing an example of examination orders of examinee.

First, the memory 32 associates at least incident angles of X-rays with clinical purposes of the imaging regions included in the examination order (shown in FIG. 3A) and stores such information in the form of an association table. Each of the incident angles of X-rays refers to an inclining angle with respect to a reference such as a vertical direction. For example, in addition to the incident angles of X-rays, the memory 32 may associate imaging regions and postures of the subject with clinical purposes included in the examination order respectively, and stores such information as an association table.

The incident angle of X-rays may be associated with an identical clinical purpose, or the incident angle of X-rays may be associated with each group having similar clinical purposes. One group may have one identical clinical purpose or similar clinical purposes. Having similar clinical purposes refer to containing the same word (e.g., knee joint), even though the clinical purpose is not exactly the same. Alternatively, a technique may be used in which a database is generated by pre-associating the clinical purpose with the type of the clinical purpose group, and the type of the clinical purpose group corresponding to a desired clinical purpose is acquired by referring to the database. For example, machine learning is used for the acquisition process of the type of clinical purpose group. As the machine learning, deep learning using multilayer neural networks such as convolutional neural networks (CNN) and convolutional deep belief networks (CDBN) is applied. With these techniques, "assessment of knee joint displacement and degenerative region" and "fracture diagnosis of knee joint" can be considered having similar clinical purposes, and the same incident angle can be associated with such similar clinical purposes.

Figure 3B:
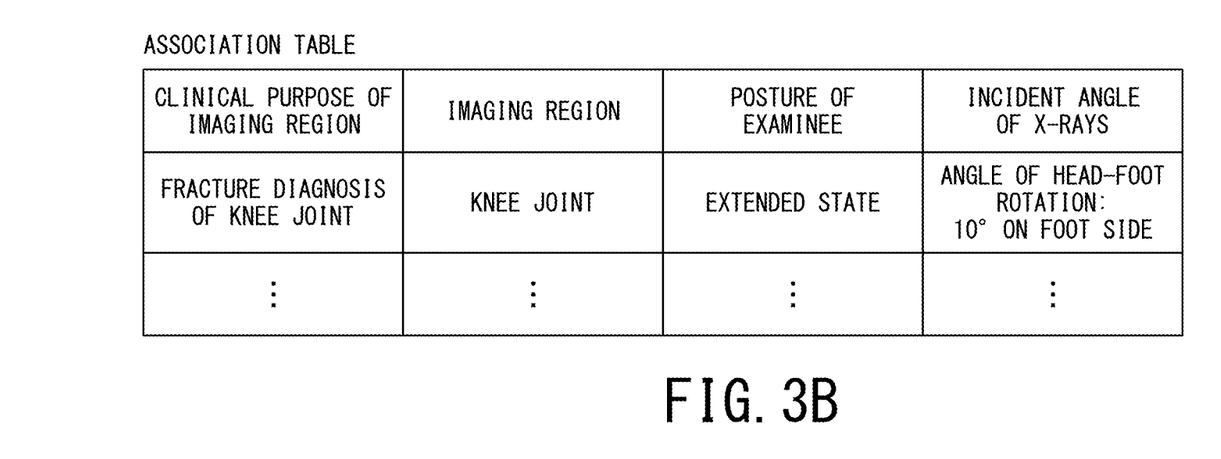
FIG. 3B is an example of association table.

An example of the association table is shown in FIG. 3B. For example, in addition to the imaging region "knee joint", the posture of the subject "extended state" and the incident angle "rotation angle in head-to-foot direction: 10° on the foot side from the vertical direction" are associated with the clinical purpose of the imaging region "fracture diagnosis of knee joint".

Returning to the description of FIG. 2, the data acquiring function 311 includes a function of acquiring the incident angle of X-rays corresponding to the clinical purpose of the imaging region, and a function of acquiring image data from an image sensor C, which captures an image of the patient. Specifically, the data acquiring function 311 acquires the examination order of examinee. The data acquiring function 311 then refers to the association table stored in the memory 32 to acquire an incident angle of X-rays corresponding to the clinical purpose of the imaging region included in the acquired examination order of examinee.

The tube moving control function 312 includes a function of rotating the X-ray tube 11*a* (for example, rotating about the X-axis) according to the incident angle of X-rays acquired by the data acquiring function 311, and sliding a position of the central path of X-rays with respect to the imaging region (for example, sliding in the Z-axis direction) based on the image data acquired by the image sensor. Specifically, the tube moving control function 312 slides the X-ray tube 11*a*, the examination table 14*a*, or the lie-down imaging FPD 15*a* (for example, slides in the Z-axis direction) to change the relative position between the central path of X-rays and the imaging region.

The imaging control function 313 includes functions of causing the detector units 13 and 15 to perform X-ray imaging of the patient, performing logarithmic conversion processing (LOG processing) on the projection data output from the detector units 13 and 15, performing addition processing as necessary, generating X-ray image data, and performing image processing on the generated X-ray image. The image processing includes enlargement/gradation/spatial filter processing on data, minimum/maximum value trace processing on data accumulated in time series, addition processing for removing noise, and the like. The image-processed data is output to the display 33 and stored in the memory 32.

Here, the X-ray imaging is roughly classified into simple imaging and fluoroscopic imaging. The simple imaging is radiography in which X-rays are irradiated with a relatively high tube current, and mainly refers to one-shot photography for collecting CR (Computed Radiography) images, though moving image photography can also be applied. On the other hand, the fluoroscopic imaging is radiography in which X-rays are irradiated with a relatively low tube current, and mainly refers to moving image photography. Further, the fluoroscopic imaging is roughly classified into continuous fluoroscopy and pulse fluoroscopy. Unlike the continuous fluoroscopy, the pulse fluoroscopy applies a fluoroscopy method in which X-ray pulses are intermittently and repeatedly irradiated. By applying the pulse fluoroscopy, the continuity of fluoroscopy images (frame rate) is slightly inferior to that in continuous fluoroscopy, but the exposure dose to the examinee can be suppressed. In this embodiment, X-ray imaging may be either the simple imaging or the fluoroscopic imaging.

Figure 4:
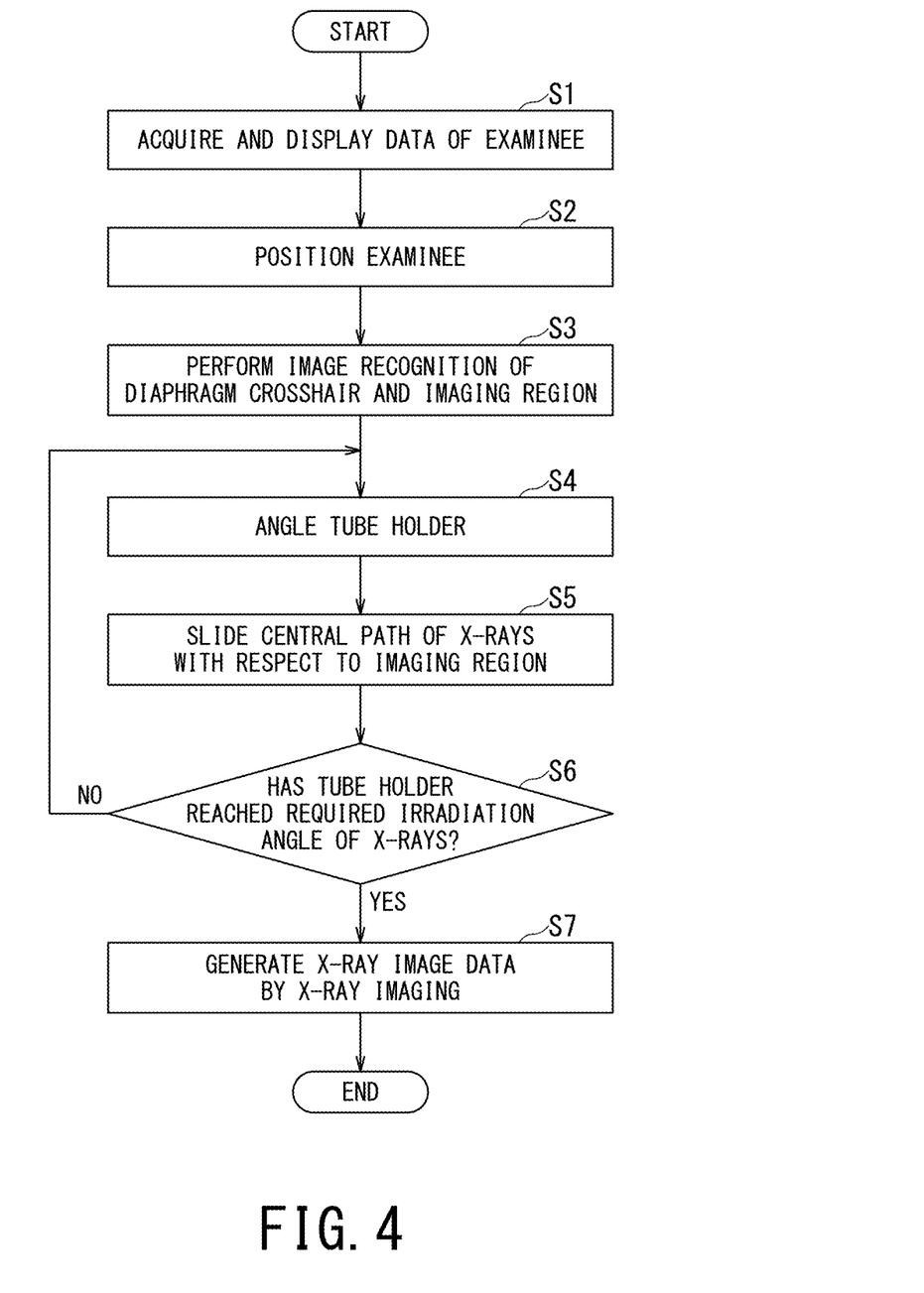
FIG. 4 is a flowchart showing an operation of the X-ray diagnostic apparatus according to the embodiment.

Details of the functions 311 to 313 will be described later with reference to FIGS. 4 to 9C. In FIG. 4, numerals attached to "S" indicate respective steps of the flow chart.

In step S1 of FIG. 4, the data acquiring function 311 acquires and displays data corresponding to the examinee. Specifically, the data acquiring function 311 acquires the clinical purpose of the imaging region "fracture diagnosis of knee joint" of the examinee from the examination order (shown in FIG. 3A), makes reference to the association table (shown in FIG. 3B), and acquires the incident angle of X-rays as "10° on the foot side" corresponding to the clinical purpose "fracture diagnostic of knee joint" of the imaging region. Then, the data acquiring function 311 displays the incident angle of X-rays as "10° on the foot side" (shown in the upper part of FIG. 5A) on the operation panel 11c. Note that when the association table includes imaging regions and postures of examinee, the data acquiring function 311 may acquire the imaging region "knee joint" and the posture of the examinee "extended state" corresponding to the clinical purpose "fracture diagnosis of knee joint", and display such information on the operation panel 11c. Further, it is not limited to the case where the data acquiring function 311 acquires conditions from the examination order of examinee. The operator may perform selection from incident angles of X-rays acquired from past examination orders of examinees.

Next, in step S2, an operator such as a technician positions the examinee. Specifically, the examinee is required to take a posture on the bed 14 in accordance with the information on imaging region and the posture of the examinee displayed in step S1. Then, the data acquiring function 311 displays a crosshair by the diaphragm lamp (hereafter refers to diaphragm crosshair), so that the operator can operate the tube holder 11 while checking the crosshair. Then, the operator moves the tube holder 11, that is, the X-ray tube 11a, such that the imaging region of the examinee becomes the center of an irradiation field.

Next, in step S3, the data acquiring function 311 acquires image data from the TV camera C1, and performs image recognition regarding the intersection of the central path of the X-rays and the examinee (for example, the diaphragm crosshair displayed on the examinee) and the imaging region of the examinee on the basis of the image data from the TV camera C1. Specifically, when the operator presses the image recognition switch W1 (shown in the upper part of FIG. 5A) on the operation panel 11c, the diaphragm lamp is turned on. The data acquiring function 311 then preforms image recognition of the imaging region of the examinee and the diaphragm crosshair on the basis of the image data from the TV camera C1.

The intersection of the central path of the X-rays and the examinee is not limited to the diaphragm crosshair displayed by diaphragm lamp. The intersection may be pointed by the operator, or may be a marker attached to the examinee. Further, an operation for changing the imaging region may be performed on the operation panel 11c. The data acquiring function 311 may display the image data on the operation panel 11c (shown in the upper part of FIG. 5A).

A look-up table (LUT) that associates image data with the imaging regions may be used in the process of acquiring an imaging region (for example, a knee joint) based on image data, for example. Machine learning may also be used in this process. As the machine learning, deep learning using multilayer neural networks such as CNN (convolutional neural network) and convolutional deep belief network (CDBN) may be applied.

Figure 5A:
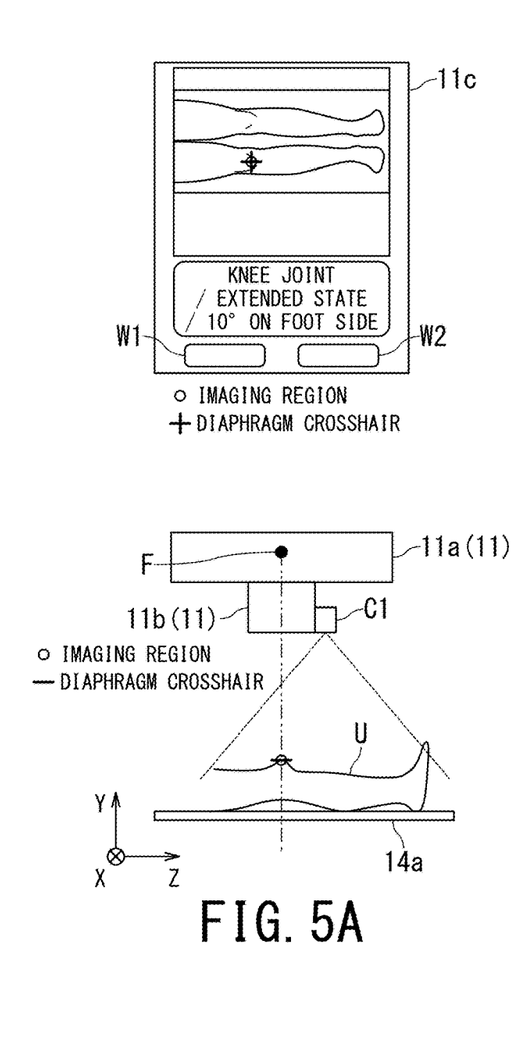
Figure 5B:
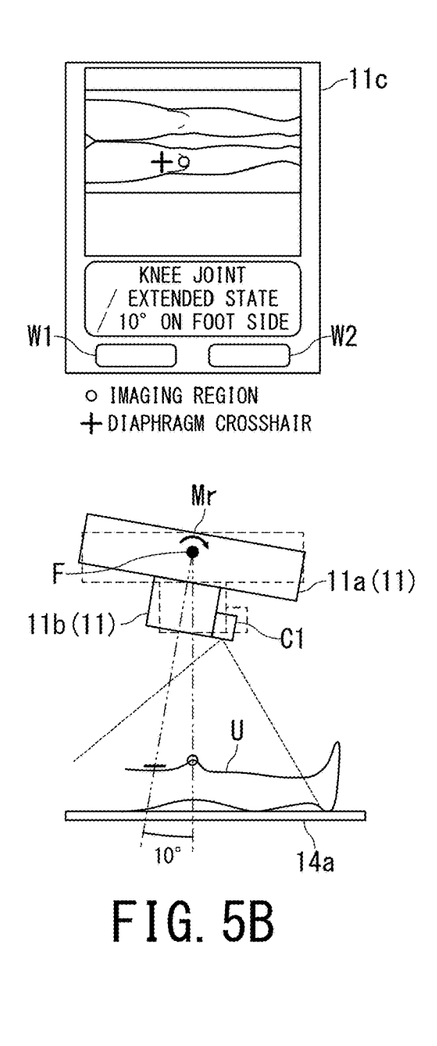

Next, in step S4, the tube moving control function 312 controls the holder driver 20, and rotates the tube holder 11 around an axis parallel to the X-axis that passes through the X-ray focus F so as to angle the tube holder 11. Specifically, when the operator presses an angle-change operation start switch W2 (shown in the upper part of FIG. 5A) on the operation panel 11c, the tube moving control function 312 rotates the tube holder 11 along the direction Mr toward the incident angle of the X-rays acquired in step S1 by a predetermined angle (for example, 1° on the foot side from the vertical direction). As a result, the state shown in FIG. 5A changes to the state shown in FIG. 5B. Note that the operation start switch W2 is not limited to one provided on the operation panel 11c, and may be, for example, a foot switch. For the sake of convenience, FIG. 5B shows the final incident angle of "10° on the foot side from the vertical direction".

To avoid unnecessary exposure of the examinee, the tube moving control function 312 may, in accordance with the angle of the tube holder 11, control the diaphragm blades of the X-ray movable diaphragm 11b so as to narrow the aperture through which the X-rays pass. For example, the tube moving control function 312 controls the diaphragm blades of the X-ray movable diaphragm 11b so as to narrow the aperture on the head side, such that the irradiation range over the head side due to the angle change as shown in FIG. 5B can be narrowed.

Figure 5C:
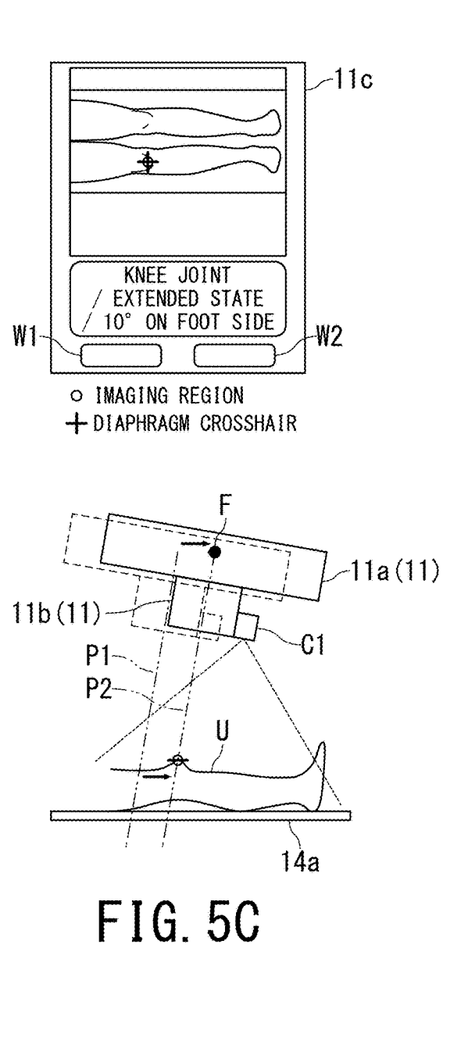

Next, in step S5, the tube moving control function 312 slides the position of the central path of X-rays (tube holder 11, examination table 14a, or lie-down imaging FPD 15a) with respect to the imaging region from P1 to P2 in the Z-axis direction such that the imaging region coincides with the diaphragm crosshair as recognized based on the image data in step S3. FIG. 5C shows a case where the tube holder 11 is slid as an example. Due to the rotation of the tube holder 11 in step S4 described above, a positional deviation occurs between the imaging region and the diaphragm crosshair (shown in FIG. 5B). Therefore, in step S5, the tube moving control function 312 slides the central path of the X-rays to correct the positional deviation between the imaging region and the diaphragm crosshair caused by the rotation of the tube holder 11.

Through steps S4 and S5, the tube holder 11 is automatically rotated such that the position of the imaging region and the position of the diaphragm crosshair as recognized in step ST3 do not change, and the central path of the X-rays is slid. Also, by repeating a set of steps S4 and S5 multiple times, the angle of the tube holder 11 is gradually increased so as to gradually approach the set angle (for example, when the set angle is 10°, 1° is increased each time), but it is not limited to that case. For example, the tube holder 11 may reach the set angle at once by performing the set of steps S4 and S5 for one time only (for example, when the set angle is 10°, 10° is increased at once).

The rotation direction of the tube holder 11 in step S4 is not limited to the head-to-foot direction, that is, the rotation direction around the X-axis. It may be a rotation direction around the Y-axis or the Z-axis. The direction in which the central path of X-rays is slid in step S5 is not limited to the Z-axis direction. It may be the X-axis direction.

Next, in step S6, the tube moving control function 312 determines whether or not the tube holder 11 in step S4 has reached the incident angle of X-rays acquired in step S1. If "NO" in step S6, that is, if the angle changed in step S4 is not the same as the incident angle of X-rays acquired in step S1, the process returns to step S4. Then, the tube moving control function 312 rotates the tube holder 11 so as to further angle the tube holder 11 (illustrated in FIG. 5B). Fine angle change (for example, 1° on the head side) and sliding are repeated in such manner until the incident angle reaches "10° on head side".

On the other hand, if "YES" in step S6, that is, if the angle changed in step S4 is the same as the incident angle of X-rays acquired in step S1, the moving operation of the tube holder 11 finishes. The tube moving control function 312 may display information indicating "finish moving operation" on the operation panel 11c of the tube holder 11. The operation panel 11c of the tube holder 11 may be provided with a switch for manually making fine adjustment of the incident angle (for example, "+1", "−1") after automatic angle setting. When the switch is pressed, the operation returns to step S5, and the tube moving control function 312 slides the central path of X-rays.

Next, in step S7, the imaging control function 313 controls the lie-down imaging detector unit 15 and the like to perform an X-ray imaging of the examinee, thereby generating X-ray image data.

In the above description, the case where the imaging region is the knee joint is described, but the present invention is not limited to this case. The imaging region may be any region that requires angle change with respect to the bone for X-ray irradiation. For example, the imaging region may be: an elbow joint; a spine; and an otorhinolaryngeal bone that requires angle-change with respect to a skull.

As described above, according to the X-ray diagnostic apparatus 1, the operator does not need to manually set the angle. Therefore, it is possible to improve the efficiency of setting the incident angle of X-rays and reduce the operator's workload. In addition, it is possible to reduce variations in incident angles due to differences in operator skill, and to reduce unnecessary radiation exposure caused by redoing the imaging.

First Modification

In the above description, the angle change of the tube holder 11 is described in the case where the image sensor C is one TV camera C1 and where the imaging region of the examinee is perpendicular to the central path of X-rays (where the incident angle of X-rays is an inclining angle to the vertical direction). However, the image sensor C may be two TV cameras C1. In this case, the tube holder 11 is angled after correcting the inclination from the central path of X-rays on the surface of the imaging region. This case will be described with reference to FIGS. 6 and 7.

Figure 6:
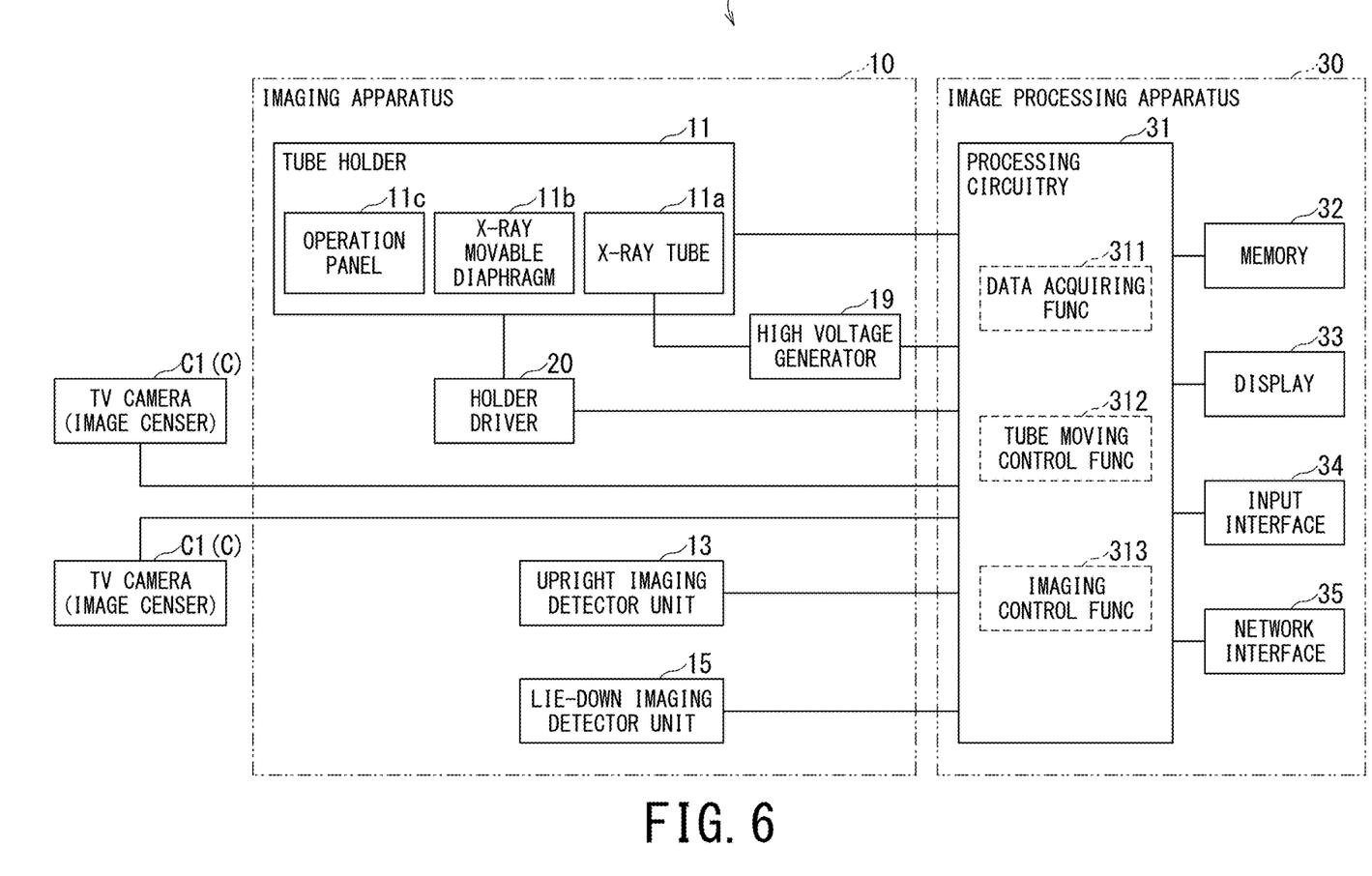
FIG. 6 is an overall configuration diagram of the first modification of the X-ray diagnostic apparatus according to the embodiment.

In FIG. 6, the same members as those in FIG. 2 are assigned the same reference numerals, and the description thereof is omitted. Note that the optical camera including the image sensor C is not limited to the two TV cameras C1, and may be two cameras for taking still images.

The X-ray diagnostic apparatus 1 includes two TV cameras C1 arranged along the Z-axis direction. The data acquiring function 311 acquires image data from at least one of the two TV cameras C1, and performs image recognition of the imaging region and the diaphragm crosshair on the basis of the image data. On the other hand, the two cameras C1 function as sensors (stereo cameras) capable of measuring distance. Then, the data acquiring function 311 measures the distance to a surface of a region near the imaging region that is inclined to the horizontal direction, thereby acquiring the surface of the region. For example, when the imaging region is a knee joint, the data acquiring function 311 acquires the surface L1 of the shin near the knee joint (shown in FIG. 7B).

The tube moving control function 312 rotates the X-ray tube 11a such that it is perpendicular to the surface L1 acquired by the data acquiring function 311.

Figure 7A:
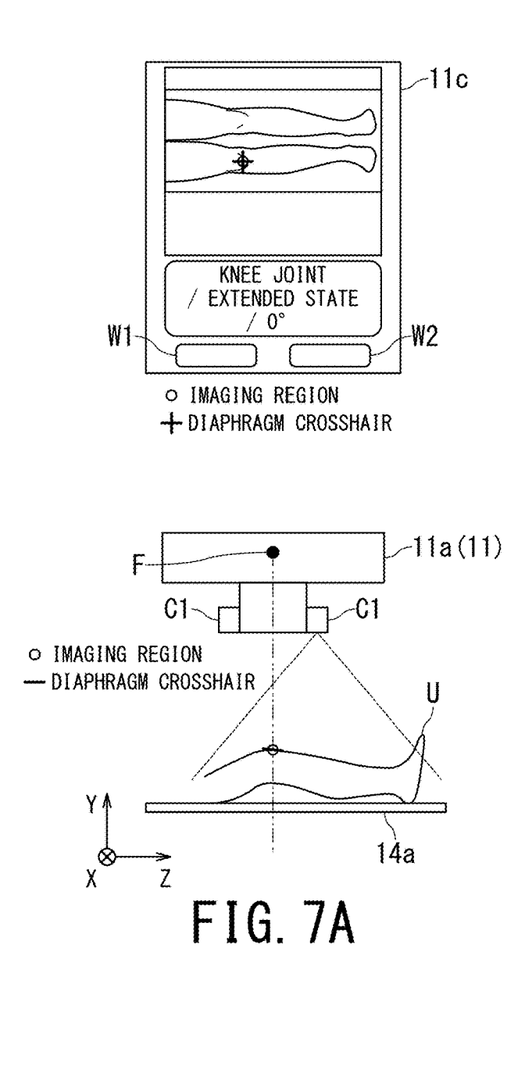
Figure 7B:
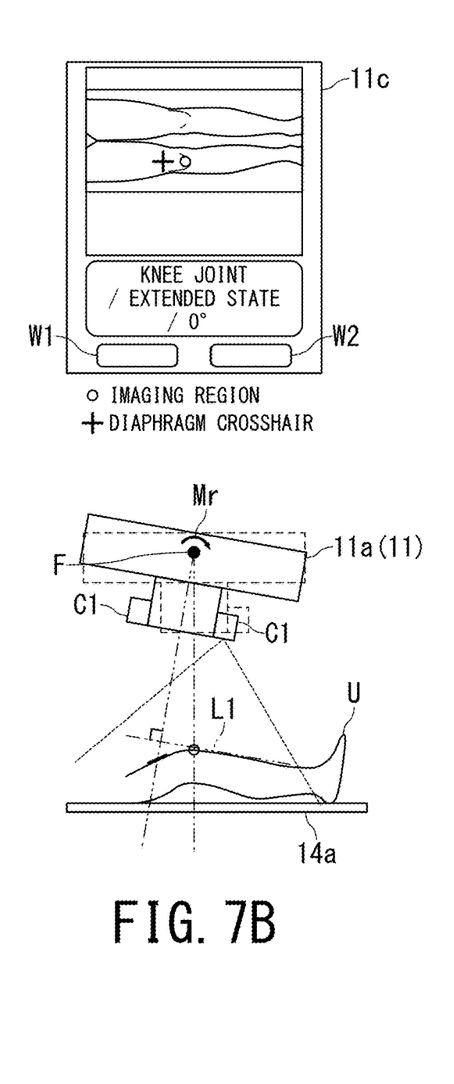

Next, the first modification of the X-ray diagnostic apparatus 1 will be specifically described with reference to FIG. 7.

When the operator presses the angle-change operation start switch W2 on the operation panel 11c (shown in the upper part of FIG. 7A), the tube moving control function 312 rotates the tube holder 11 along the direction Mr such that the central path of X-rays is set perpendicular to the acquired surface L1 of the shin (0° on the head side (or the foot side) from the direction perpendicular to the surface L1). That is, the state shown in FIG. 7A changes to the state illustrated in FIG. 7B.

Figure 7C:
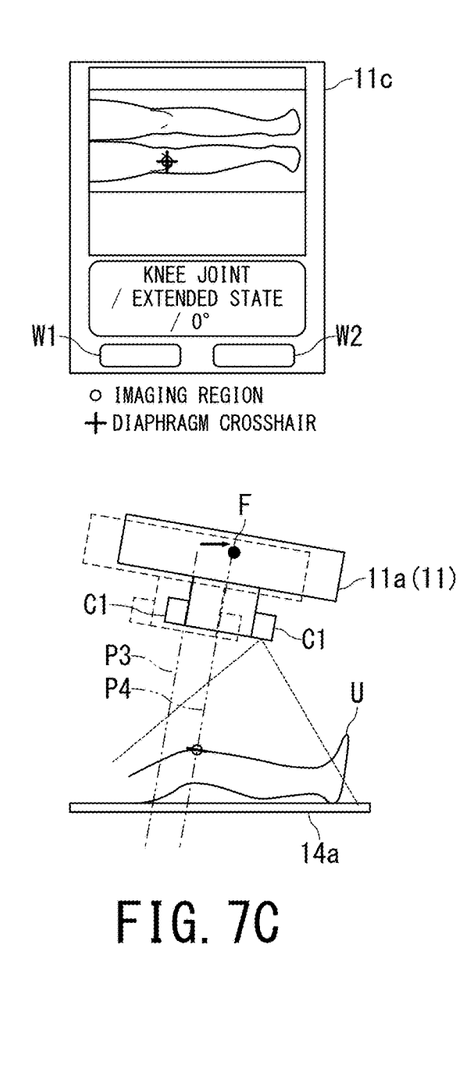

Next, the tube moving control function 312 slides the X-ray central path (tube holder 11, examination table 14a, or lie-down imaging FPD 15a) from P3 to P4 in the Z-axis direction with respect to the imaging region such that the imaging region coincides with the diaphragm crosshair as recognized based on the image data (FIG. 7C). Due to the rotation of the tube holder 11, a positional deviation occurs between the imaging region and the diaphragm crosshair (shown in FIG. 7B) Therefore, the tube moving control function 312 slides the central path of X-rays in order to correct the positional deviation between the imaging region and the diaphragm crosshair caused by the rotation of the tube holder 11.

If the angle change of the tube holder 11 as required is 0°, the moving operation of the tube holder 11 ends at this point. On the other hand, if the angle change of the tube holder 11 as required is not 0°, the process proceeds to step S1 in FIG. 4, and the tube holder is angled as desired with respect to the imaging region.

Although the surface L1 is obtained by using the two TV cameras C1 as stereo cameras, the present invention is not limited to this case. The surface L1 may be acquired by measuring the distance using only one TV camera C1.

As described above, according to the first modification of the X-ray diagnostic apparatus 1, it is possible to improve the efficiency of setting the incident angle of X-rays and reduce the operator's workload in consideration of the inclination of the surface of the imaging region. In addition, it is possible to reduce variations in incident angles due to differences in operator skill, and to reduce unnecessary radiation exposure caused by redoing the imaging.

Second Modification

The case where the image sensor C is a TV camera C1 is described above. However, the image sensor C may be a 3D (three-dimensional) scanner, and the tube holder 11 may be angled while considering the inclination of the surface of the imaging region. This case will be described with reference to FIGS. 8 and 9.

Figure 8:
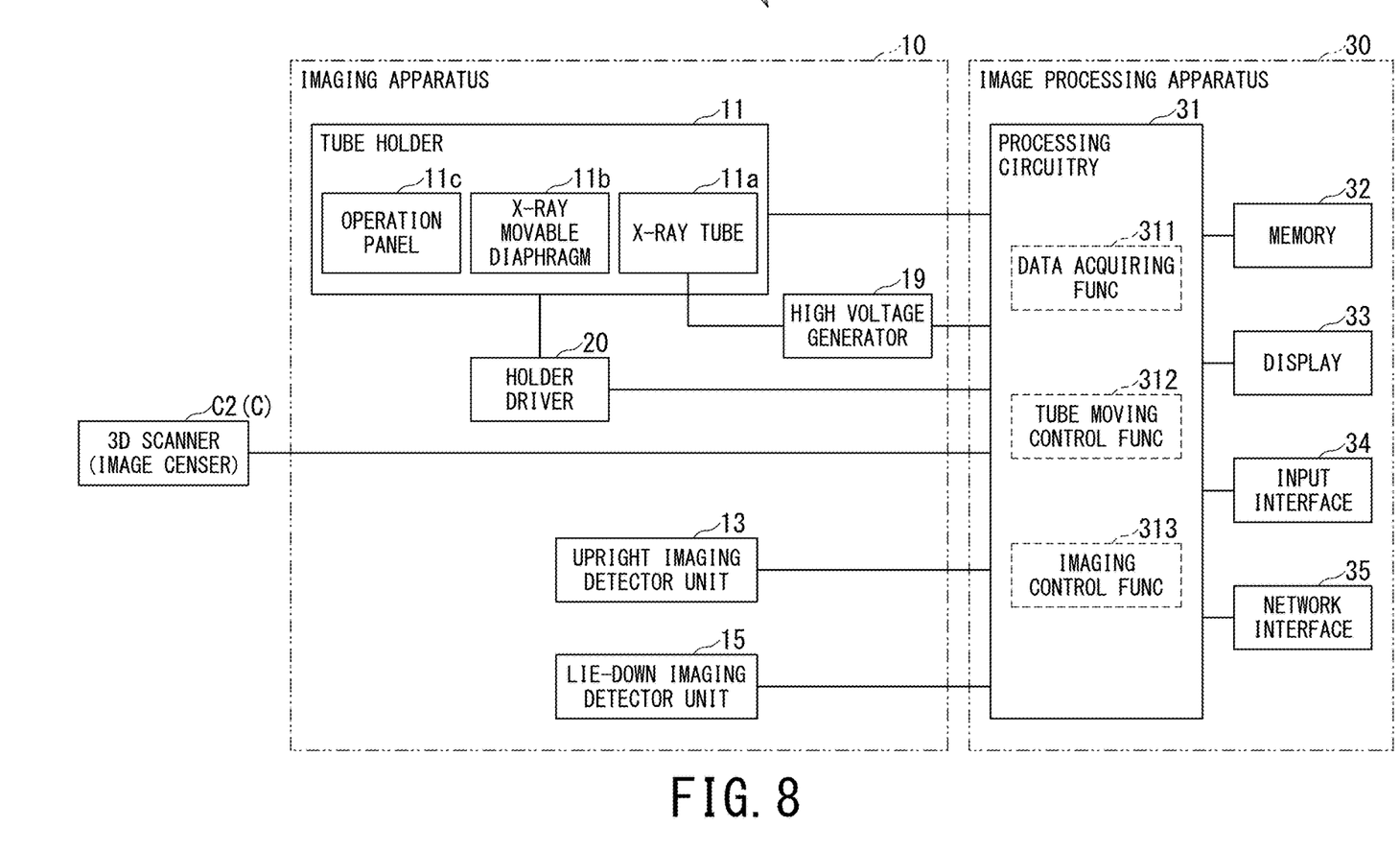
FIG. 8 is an overall configuration diagram of the second modification of the X-ray diagnostic apparatus according to the embodiment.

In FIG. 8, the same members as those in FIG. 2 are assigned the same reference numerals, and the description thereof is omitted.

The X-ray diagnostic apparatus 1 has a 3D scanner C2. The 3D scanner C2 is also called a range sensor, and is a scanning optical range finder capable of outputting spatial physical shape data. The data acquiring function 311 measures the distance to a surface of a region near the imaging region that is inclined to the horizontal direction, thereby acquiring the surface of the region. For example, when the imaging region is a knee joint, the data acquiring function 311 acquires a surface L1 of a relatively flat region near the knee joint, for example a shin (shown in FIG. 9B).

The tube moving control function 312 rotates the X-ray tube such that it is perpendicular to the surface L1 acquired by the data acquiring function 311.

Figure 9A:
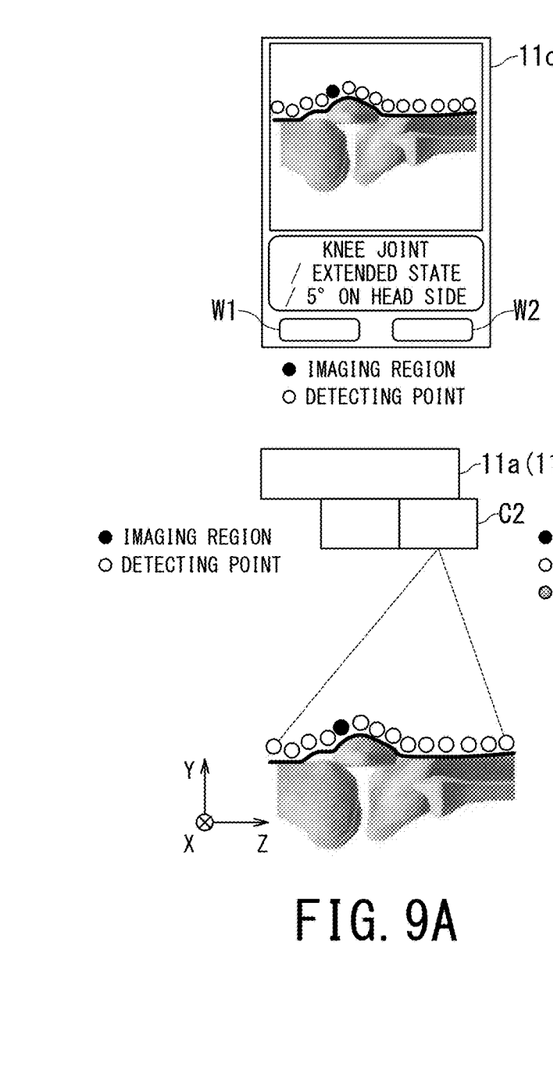

Next, the second modification of the X-ray diagnostic apparatus 1 will be specifically described with reference to FIG. 9.

The data acquiring function 311 acquires cross-sectional image data showing a vertical cross-section of the examinee on the basis of the 3D distance image data acquired by the 3D scanner C2, and sets multiple detection points in cross-sectional image data. Then, the data acquiring function 311 displays the cross-sectional image data and the multiple detection points on the operation panel 11c (shown in the upper part of FIG. 9A). The operator designates an imaging region as a target incident point from the multiple detection points displayed on the operation panel 11c.

Figure 9B:
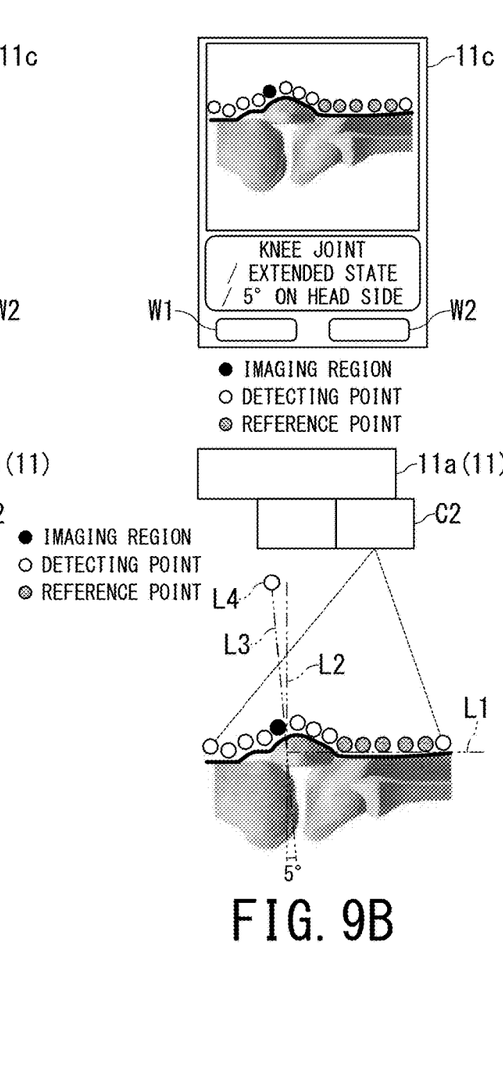
Figure 9C:
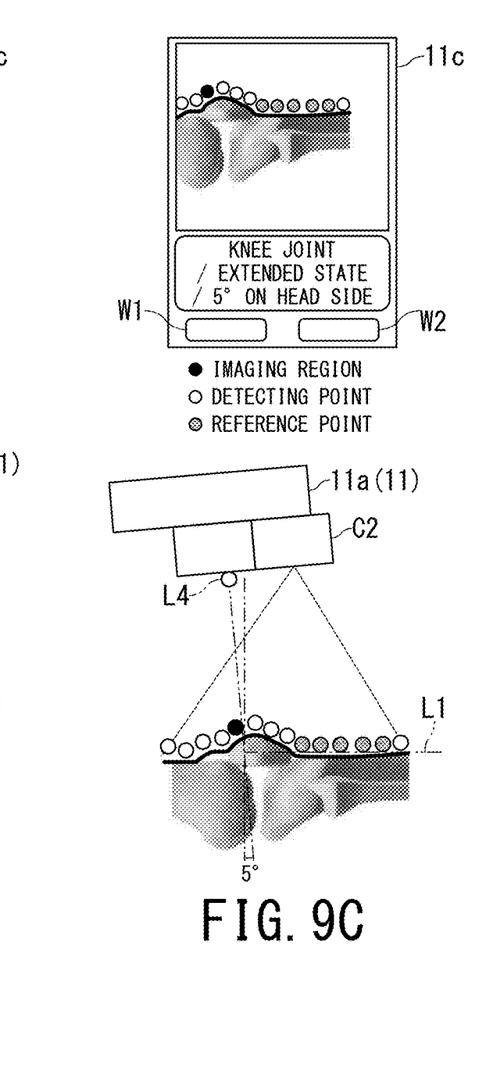

On the other hand, the data acquiring function 311 sets and displays multiple reference points from the detection points near the imaging region (shown in the upper part of FIG. 9B). For example, when a predetermined number of continuous detection points are arranged substantially on a straight line, the data acquiring function 311 sets the continuous detection points as the multiple reference points (shown in the bottom part of FIG. 9B).

Next, the data acquiring function 311 acquires the perpendicular line L2 based on the straight line L1 (for example, on the surface of the shin near the knee joint) acquired from the multiple reference points (shown in the bottom part of FIG. 9B). The data acquiring function 311 refers to the association table stored in the memory 32 so as to acquire an incident angle of X-rays (for example, 5° on the head side) corresponding to the clinical purpose of the imaging region included in the acquired examination order of examinee. The data acquiring function 311 sets the line L3 to an angle acquired by adding the incident angle of X-rays based on the association table to the perpendicular line L2 (shown in the bottom part of FIG. 9B).

Next, the data acquiring function 311 sets an irradiation point L4 at an arbitrary position on the line L3 of X-rays (shown in the bottom part of FIG. 9B). Then, the tube moving control function 312 rotates the tube holder 11 by a predetermined angle (for example, 1° on head side from the perpendicular line L2) towards an X-ray incident angle of "5° on the head side from the perpendicular line L2". In such manner, the state shown in FIG. 9B changes to the state shown in FIG. 9C. Next, the tube moving control function 312 slides the position of the central path of X-rays (tube holder 11, examination table 14a, or lie-down imaging FPD 15a) with respect to the imaging region in the Z-axis direction and the Y-axis direction such that the central path of X-rays coincides with the irradiation point L4 on the line L3.

When the incident angle of X-rays is "0° on the head side (or the foot side)", the irradiation point L4 is set on the perpendicular line L2 (not shown). Then, the tube moving control function 312 rotates the tube holder 11 such that it is perpendicular to the surface L1. Further, the tube moving control function 312 slides the position of the central path of X-rays with respect to the imaging region such that the central path of X-rays coincides with the irradiation point L4 on the perpendicular line L2.

As described above, according to the second modification of the X-ray diagnostic apparatus 1, it is possible to improve the efficiency of setting the incident angle of X-rays and reduce the operator's workload in consideration of the inclination of the surface of the imaging region. In addition, it is possible to reduce variations in incident angles due to differences in operator skill, and to reduce unnecessary radiation exposure caused by redoing the imaging.

According to at least one embodiment described above, it is possible to improve the efficiency of setting the incident angle of X-rays and reduce the operator's workload.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, changes, and combinations of embodiments in the form of the methods and systems described herein may be made without departing from the spirit of the inventions. The accompanying claims and their equivalents are intended to cover such forms or modifications as would fall within the scope and spirit of the inventions.

What is claimed is:

1. An X-ray diagnostic apparatus generating and displaying X-ray projection image data, comprising:
    an X-ray tube configured to irradiate an imaging region of a subject with X-rays;
    an X-ray detector configured to detect the X-rays; and
    processing circuitry configured to
        acquire an incident angle of the X-rays corresponding to a clinical purpose of the imaging region, and acquire image data from an optical camera that images the imaging region, and
        rotate the X-ray tube to reach the acquired incident angle of the X-rays, and slide a position of a central path of the X-rays with respect to the imaging region based on the image data.

2. The X-ray diagnostic apparatus according to claim 1, further comprising: the optical camera.

3. The X-ray diagnostic apparatus according to claim 1, wherein the processing circuitry is configured to slide the position of the central path of the X-rays with respect to the imaging region such that the imaging region as recognized based on the image data coincides with an intersection of the central path of the X-rays and the subject.

4. The X-ray diagnostic apparatus according to claim 3, wherein the processing circuitry is configured to slide the position of the central path of the X-rays with respect to the imaging region by sliding the position of the X-ray tube or a table on which the subject is placed.

5. The X-ray diagnostic apparatus according to claim 1, further comprising:
    a memory configured to store an association table in which the incident angles of the X-rays are associated with the clinical purposes, wherein
    the processing circuitry is configured to acquire an incident angle of the X-rays corresponding to the clinical purpose of the imaging region by referring to the association table.

6. The X-ray diagnostic apparatus according to claim 5, wherein
    the memory is configured to store, for each of the clinical purposes, the association table that associates the imaging regions with postures of the subject in addition to the incident angles of the X-rays, and the processing circuitry is configured to
  acquire an imaging region and a posture of the subject corresponding to the clinical purpose by referring to the association table, and
  display the acquired imaging region and posture of the subject on a display.

7. The X-ray diagnostic apparatus according to claim 1, further comprising: the optical camera attached to a tube holder holding the X-ray tube, the optical camera acquiring the image data by imaging.

8. The X-ray diagnostic apparatus according to claim 1, wherein the processing circuitry is configured to
  acquire a surface of the imaging region from a region near the imaging region having an inclination to a horizontal direction based on the image data,
  rotate the X-ray tube such that it is perpendicular to the surface of the imaging region, and
  slide the central path of the X-rays such that the imaging region as recognized based on the image data coincides with an intersection of the central path of the X-rays and the subject.

9. The X-ray diagnostic apparatus according to claim 1, wherein the processing circuitry is configured to
  acquire a surface of the imaging region from a region near the imaging region having an inclination to a horizontal direction based on the image data,
  rotate the X-ray tube such that it is perpendicular to the surface of the imaging region, and
  slide the position of the central path of the X-rays with respect to the imaging region such that the central path of the X-rays coincides with an irradiation point on a perpendicular line to the surface of the imaging region.

* * * * *